J. P. WEIS.
SHIFTABLE WORK PLATE FOR SEWING MACHINES.
APPLICATION FILED JAN. 9, 1911.

992,526.

Patented May 16, 1911.

Witnesses:
R. W. Pittman
F. E. Boyes

Inventor
John P. Weis
By his Attorney

UNITED STATES PATENT OFFICE.

JOHN P. WEIS, OF NYACK, NEW YORK, ASSIGNOR TO LUCIUS N. LITTAUER, OF GLOVERSVILLE, NEW YORK.

SHIFTABLE WORK-PLATE FOR SEWING-MACHINES.

992,526.

Specification of Letters Patent.

Patented May 16, 1911.

Application filed January 9, 1911. Serial No. 601,504.

*To all whom it may concern:*

Be it known that I, JOHN P. WEIS, a citizen of the United States, residing at Nyack, in the county of Rockland and State of New York, have invented certain new and useful Improvements in Shiftable Work-Plates for Sewing-Machines, of which the following is a specification.

This invention relates to the work or supporting plates of sewing machines, and more particularly to those forms of work plates having a shiftable portion or plate by means of which access to the stitching mechanism at the underside of the plate is permitted, the object of the invention being to provide an improved plate simple in its construction and operation and which may be readily swung away from the work plate to permit the threading, oiling and cleaning of the mechanism beneath the plate.

Heretofore it has been the usual practice to provide work plates with a sliding plate, usually sliding at right angles to the line of feed, for the purpose of permitting access to the mechanism beneath the plate. These plates, however, were usually held in position by friction, the plates sliding in a dovetailed groove formed in the edge of the main plate forming the wall of an opening, and owing to the vibration of the machine while operating at considerable speed the friction had to be considerable in order to hold the plate in position and against premature shifting, otherwise the vibration of the machine would cause the plate to open so that the trimmings or work being operated upon would pass through the opening and become entangled with the moving parts, and consequently, being held in position by friction it was sometimes very difficult for the operator to shift the plates. These plates were usually provided with a thumb depression to permit them to be shifted, but frequently the plates were held so tight that it was impossible for the operator to slide them and the operator would take anything at hand for the purpose of banging the plate, such as a pair of shears or a screwdriver, and eventually a hole was poked therethrough.
The gist of the present improvement, therefore, consists in providing a plate which may be readily shifted and which does not depend upon friction for holding it in its proper closed position, and in which the vi-
bration of the machine will not cause the plate to shift.

Figure 1:
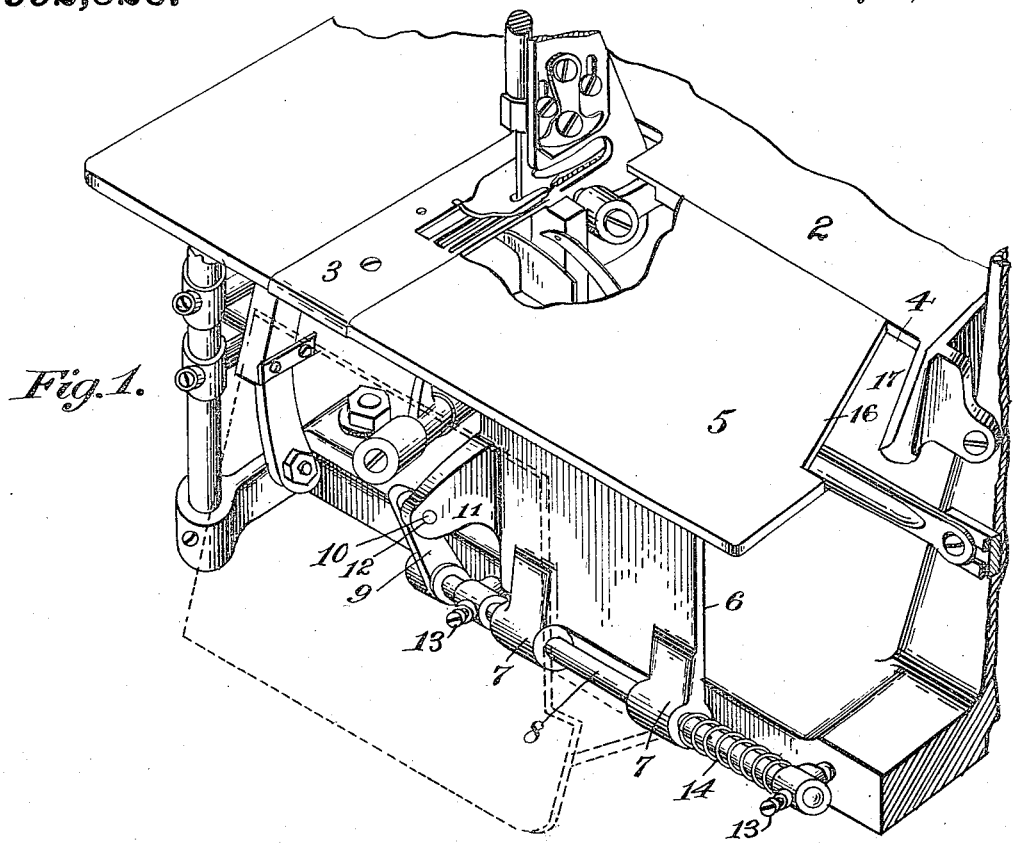
Figure 2:
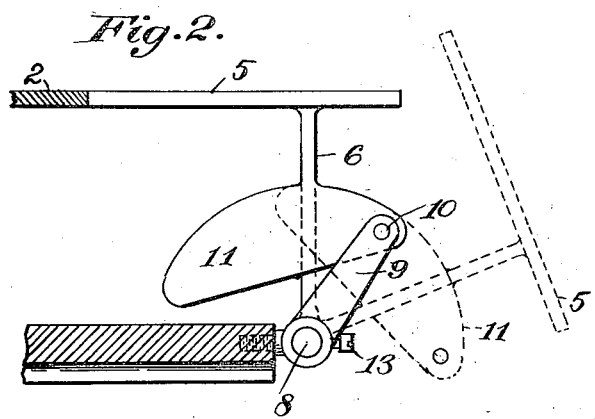
Figure 3:
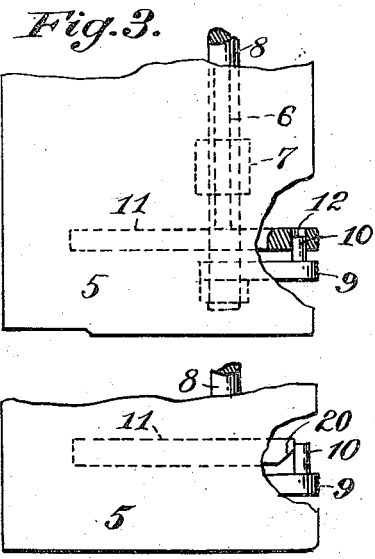
Figure 4:
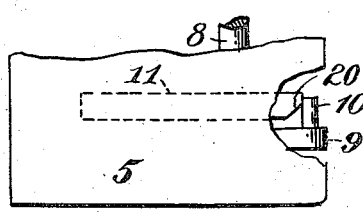

In the drawings accompanying and forming part of this specification, Figure 1 is a perspective view of so much of a sewing machine base as is necessary to illustrate the present improvement, which is shown in full lines in its proper closed position with a part thereof broken away, and in dotted lines swung away from the main plate of the machine to permit access to the working parts thereof; Fig. 2 is a partial end view of the plate in its several positions looking from left to right in Fig. 1 and illustrating in section so much of the sewing machine base as is necessary to show the proper position of the plate; Fig. 3 is a top view of a portion of the plate; and Fig. 4 is a view of a modified form of the present improvement.

Similar characters of reference indicate corresponding parts throughout the figures of the drawings.

The main work plate 2 carrying the throat plate 3 is recessed as at 4 for the reception of this improved swinging plate 5, which is provided at its underside with a supporting bracket 6 having a pair of apertured lugs or sleeves 7 for the reception of a rod or shaft 8 securely fixed to the base of the machine. On one end of this rod there is located an upwardly projecting arm 9 projecting away from the base of the machine, and which arm is shown provided with a pin 10. Carried by the bracket 6 of the swinging plate is a crosswise extending arm 11 having at its outer end an opening 12 for the reception of the pin of the arm 9 carried by the rod 8. Located on the end of this rod 8, which may be adjustable lengthwise in its supports by means of set screws 13, is a spiral spring 14 effective to push the swinging plate toward the throat plate of the machine, and when the plate is in its proper work supporting position, with the opening carried by the arm 11 in register with the pin of the arm 9, the spring will force the plate longitudinally of its rod so that the pin will enter the opening and lock the plate against movement. When it is desired to swing the plate so as to permit access to the mechanism at the underside of the work plate it is merely necessary to push the plate against the action of its spring on the rod so as to release the pin from the opening, whereupon the plate can be readily swung down in the manner shown in dotted lines in Fig. 1 and in Fig. 2, so that the mechanism at the underside of the work plate can be readily got at. On swinging the plate upward, when it reaches its proper normal work supporting position, the spring automatically forces it toward the throat and consequently carries the opening hereinbefore referred to into position to be engaged by the pin, whereby it is locked against movement in a manner which will be readily understood.

The endwise movement of the swinging plate, to release it from its locking pin, carries it a sufficient distance away from the throat plate to permit it to clear that part of the stitching and trimming mechanism which is above the throat plate, and to maintain it in this position the crosswise extending arm 11 hereinbefore referred to is made of sufficient length so that it will engage the pin of the arm 9 throughout the entire arc of movement of the swinging plate and so hold the plate away from the throat plate until it has been swung back into position with the opening of the arm 11 in register with the pin 10 of the arm 9. This arm 11 thus constitutes a guiding or positioning means for positioning the plate during its swinging movement, the arm being held always in engagement with the pin owing to the action of the spring, so that on the mere shifting of the plate back to its normal work supporting position the pin will automatically enter the opening of the arm and lock the plate in such position.

From the foregoing it will be seen that when the plate is swung upward into its normal position the spring automatically forces it into engagement with the throat plate as soon as the pin of the arm 9 is in register with the opening carried by the crosswise extending arm 11 of the swinging plate, and that by merely shifting the plate against the tension of its spring the pin will be released from the opening, whereupon the plate can be swung down, it being held away from the throat plate by the crosswise extending arm hereinbefore referred to. By having this endwise movement of the plate, the plate is forced away from the trimming mechanism or any other mechanism carried adjacent to the needle mechanism, so that the plate can be readily swung down, and to permit this endwise movement the work plate is cut away, as at 16, and the swinging plate has its edge spaced apart therefrom, as at 17. It will thus be observed that the device is extremely simple, inexpensive and easily operated. It will be understood, however, that other means for locking the plate might be used if desired; for instance, instead of an opening the crosswise extending arm 11 may be provided with a cam or inclined face 20, see Fig. 4, whereby, on pulling the plate forward, instead of shifting it endwise the plate is automatically shifted endwise by means of the pin hereinbefore referred to, the pin projecting slightly across the end of the arm so as to lock the plate in its normal work supporting position.

I claim as my invention:

1. The combination with a work plate of a sewing machine, of a supplemental work plate having a movement in two transverse directions, means for supporting it, and means for holding the plate in its normal work supporting position and for also holding it away from the throat plate during its movement in one of such transverse directions.

2. The combination with a recessed work plate of a sewing machine, of a swinging work plate fitting said recess, means for supporting it, and means for automatically locking it in its work supporting position, said locking means comprising a pin adapted to engage a part of said swinging plate and a spring for forcing the swinging plate toward the throat plate.

3. The combination with a recessed work plate of a sewing machine, of a swinging plate adapted to fit said recess, and means for supporting it for endwise movement toward and from the throat plate and for swinging movement away from the work plate.

4. The combination with a recessed work plate of a sewing machine, of a swinging plate adapted to fit said recess, means for supporting it for endwise movement toward and from the throat plate and for swinging movement away from the work plate, and means for locking it in its work supporting position.

5. The combination with a recessed work plate of a sewing machine, of a swinging plate adapted to fit said recess, means for supporting it for endwise movement toward and from the throat plate and for swinging movement away from the work plate, and means for locking it in its work supporting position and comprising a pin coöperating with a part of said swinging plate.

6. The combination with a recessed work plate of a sewing machine, of a swinging plate adapted to fit said recess, means for supporting it for endwise movement toward and from the throat plate and for swinging movement away from the work plate, and means for locking it in its work supporting position and comprising a pin coöperating with a part of said swinging plate and a spring for holding it in its locked position.

7. The combination with a recessed work plate of a sewing machine, of a swinging plate adapted to fit said recess, means for supporting it for endwise movement toward and from the throat plate and for swinging movement away from the work plate, means for locking it in its work supporting position and comprising a pin coöperating with a part of said swinging plate and a spring for holding it in its locked position, and means for holding the plate away from the throat plate during its swinging movement.

8. The combination with a recessed work plate of a sewing machine, of a supplemental plate adapted to fit said recess and supported for movement in two transverse directions, and means for automatically locking it in its normal work supporting position.

9. The combination with a recessed work plate of a sewing machine, of a supplemental work plate supported for endwise and swinging movement, a rod for supporting said plate, a guide arm carried by said plate, an upstanding arm carried by said rod and having a pin adapted to coöperate with said guide arm thereby to lock the plate in its normal work supporting position, said pin being effective to hold the plate spaced apart from the throat plate during its swinging movement, and a spring carried by said rod and effective to force the plate into engagement with the throat plate and thereby to lock the same through the medium of the pin.

10. The combination with a recessed work plate of a sewing machine, of a supplemental work plate supported for endwise and swinging movement within the recess of said work plate, a rod for supporting it, a spring on said rod for maintaining the supplemental plate in engagement with the throat plate, a guide arm located below said supplemental plate, and means supported in position to engage said guide arm thereby to hold the supplemental plate in its work supporting position and also effective to hold said supplemental plate away from the throat plate during its swinging movement.

11. The combination with a recessed work plate of a sewing machine, of a supplemental work plate adapted to fit said recess and having an endwise movement relatively to the recessed work plate and also having a swinging movement toward and from the recessed work plate, means for supporting it, and means for automatically locking the plate in its normal work supporting position and for also holding it away from the throat plate during its swinging movement.

12. The combination with a recessed work plate of a sewing machine, of a supplemental work plate adapted to fit such recess, an upstanding bracket for supporting said supplemental plate, a rod for supporting said bracket to permit swinging and sliding movement of the supplemental plate, an upstanding arm carried by said rod and having a pin, a cross-wise extending arm carried by said supplemental plate bracket and having an opening for the reception of said pin, and a spring carried by the rod for holding the crosswise extending arm in engagement with the pin during the swinging movement of the supplemental plate and for forcing the plate into engagement with the throat plate when the pin and opening of the crosswise extending arm are in register thereby to lock the supplemental plate in its work supporting position.

13. The combination with a recessed work plate of a sewing machine, of a supplemental work plate supported for sliding and swinging movement relatively thereto, means for holding said supplemental plate in engagement with the throat plate and effective to permit endwise and swinging movement of such plate, and means for locking the plate in its normal work supporting position.

14. The combination with a recessed work plate of a sewing machine, of a supplemental work plate supported for sliding and swinging movement relatively thereto, means for holding said supplemental plate in engagement with the throat plate and effective to permit endwise and swinging movement of such supplemental plate, means for locking the plate in its normal work supporting position, and means for holding the plate away from the throat plate during the swinging movement thereof.

Signed at Nyack, county of Rockland, on the 3rd day of January, 1911.

JOHN P. WEIS.

Witnesses:
EDWARD L. RUSSELL,
WILLIAM Y. SWENARTON.